United States Patent
Bailey, Jr. et al.

(10) Patent No.: US 7,840,549 B2
(45) Date of Patent: Nov. 23, 2010

(54) UPDATING RETRIEVABILITY AIDS OF INFORMATION SETS WITH SEARCH TERMS AND FOLKSONOMY TAGS

(75) Inventors: Earl Wayne Bailey, Jr., Cary, NC (US); Michelle Lynn Corbin, Cary, NC (US); Jana Helton Jenkins, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 296 days.

(21) Appl. No.: 11/845,687

(22) Filed: Aug. 27, 2007

(65) Prior Publication Data

US 2009/0063447 A1     Mar. 5, 2009

(51) Int. Cl.
*G06F 7/00* (2006.01)
(52) U.S. Cl. ........................... 707/711; 707/741
(58) Field of Classification Search ............... 707/711, 707/741
See application file for complete search history.

(56) References Cited

U.S. PATENT DOCUMENTS

| | | | |
|---|---|---|---|
| 6,571,239 B1* | 5/2003 | Cole et al. | 707/5 |
| 2003/0135430 A1* | 7/2003 | Ibbotson | 705/27 |
| 2005/0010553 A1* | 1/2005 | Liu | 707/1 |
| 2005/0234891 A1* | 10/2005 | Walther et al. | 707/3 |
| 2005/0256867 A1 | 11/2005 | Walther et al. | |
| 2006/0161507 A1* | 7/2006 | Reisman | 706/12 |
| 2007/0078832 A1* | 4/2007 | Ott et al. | 707/3 |
| 2007/0174247 A1* | 7/2007 | Xu et al. | 707/3 |
| 2008/0016072 A1* | 1/2008 | Frieden et al. | 707/7 |

OTHER PUBLICATIONS

Lothian, N., "Taxonomy Directed Folksonomies", [online], Dec. 13, 2006, [retrieved on Apr. 16, 2007], retrieved from the Internet at <URL:http://blogs.educationau.edu.au/nlothian>, 4 pp.
Quintarelli, E., "Folksonomies: Power to the People", [online], Jun. 24, 2005, [retrieved on Apr. 16, 2007], retrieved from the Internet at <URL:http//www.iskoi.org/doc.folksonomies.htm>, 11 pp.
U.S. Appl. No. 11/692,984, filed on Mar. 29, 2007, entitled "Dynamic Learning in Redesigning a Composition of Web Services", invented by Chang, B.Y., V. Dheap, C.J. Hardee, and H.C. Miller, 40 pp.

* cited by examiner

*Primary Examiner*—Tim T. Vo
*Assistant Examiner*—Anh Tai V Tran
(74) *Attorney, Agent, or Firm*—Janaki K. Davda; Konrad Raynes & Victor LLP

(57) ABSTRACT

Provided are techniques for updating retrievability aids. A search request including one or more search terms is received. Each of the one or more search terms is captured. A list of topics is provided to a user as search results. User selection of a topic in the list of topics is received. After reviewing the topic, the user adds one or more folksonomy tags to the topic. The one or more folksonomy tags added by the user to the topic are captured. Each of the one or more search terms and each of the one or more folksonomy tags are mapped to the topic. For each of the search terms, based on a number of times that the search term has been used to search for the topic, the search term is added to one or more retrievability aids. For each of the one or more folksonomy tags, based on a number of times that the folksonomy tag has been applied to the topic, the folksonomy tag is added to at least one of the one or more retrievability aids.

18 Claims, 5 Drawing Sheets

UPDATING RETRIEVABILITY AIDS OF INFORMATION SETS WITH SEARCH TERMS AND FOLKSONOMY TAGS

BACKGROUND

1. Field

Embodiments of the invention relate to updating retrievability aids of information sets with search terms and folksonomy tags.

2. Description of the Related Art

With the large amount of information stored, users continuously have difficulty finding information. Often, search engines yield too many results and a wide variety of results. Even search indexes often do not contain the appropriate index entries to help users find the information that they need.

Taxonomies and controlled vocabularies are being implemented across the World Wide Web ("Web") and across information technologies, but again, these provide limited sets of terms or access points for the information. Taxonomies may be described as categories of information that may be represented hierarchically (e.g., in tree structures with parent/child nodes). A simple example of a part of a taxonomy may be a hierarchical structure in which a parent node is a car and child nodes are sedans and convertibles. Controlled vocabularies may be described as lists of terms with associated definitions. With controlled vocabularies, the designer of the vocabulary preselects specific terms to be in a particular controlled vocabulary.

Folksonomies (i.e., user-based tagging of information or user tags) are being developed all across the Web, but have the informality and incongruence of a wide variety of people assigning their own language to the information set. Folksonomies may be described as synonyms or other ways of referring to items. For example, a user who was raised in the United Kingdom may tag a sedan as a saloon, which is their word for sedan.

The taxonomies, controlled vocabularies, and folksonomies can be considered underlying retrievability aids for information sets as they are used to aid retrieving data from information sets (e.g., the Web, various data stores, etc.).

Thus, there is a need in the art for improving the use of retrievability aids for information sets.

SUMMARY OF EMBODIMENTS OF THE INVENTION

Provided are a method, computer program product, and system for updating retrievability aids. A search request including one or more search terms is received. Each of the one or more search terms is captured. A list of topics is provided to a user as search results. User selection of a topic in the list of topics is received. After reviewing the topic, the user adds one or more folksonomy tags to the topic. The one or more folksonomy tags added by the user are captured. Each of the one or more search terms and each of the one or more folksonomy tags are mapped to the topic. For each of the search terms, based on a number of times that the search term has been used to search for the topic, the search term is added to one or more retrievability aids. For each of the one or more folksonomy tags, based on a number of times that the folksonomy tag has been applied to the topic, the folksonomy tag is added to at least one of the one or more retrievability aids.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
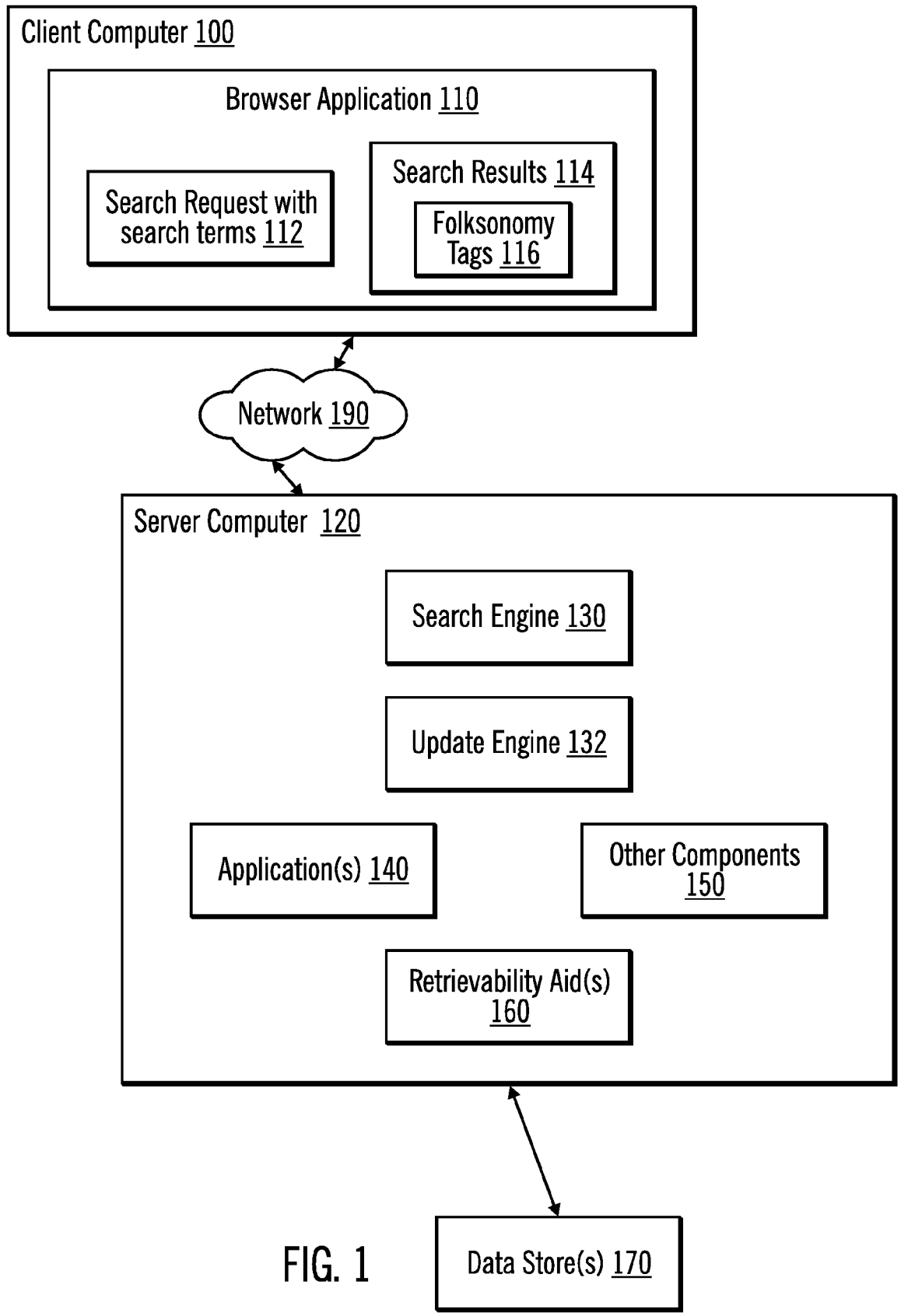
FIG. 1 illustrates details of a computing environment in accordance with certain embodiments.

FIG. 1 illustrates details of a computing environment in accordance with certain embodiments. A client computer 100 is connected via a network 190 to a server computer 120. The client computer 100 includes a browser application 110 through which a user may submit a search request with search terms 112 to locate information. The client computer 100 forwards the search request to the search engine 130 at the server computer 120 for processing. Upon receiving search results 114 from the server computer 120, the browser application 110 displays the search results 114. The user is able to add folksonomy tags 116 to the search results 114.

The server computer 120 includes a search engine 130 and an update engine 132. The server computer 120 optionally also includes one or more server applications 140 and one or more other components 150. The server computer 120 includes one or more retrievability aids (e.g., metadata, an index, a controlled vocabulary, and/or a taxonomy).

The search engine 130 processes the user search request and returns search results (e.g., as a list). The user may add folksonomy tags to an item in the list of search results. Also, the update engine 132 uses the search terms in the search request and any folksonomy tags to update retrievability aids of information sets.

The server computer 120 provides the client computer 100 with access to data in one or more data stores 170. The data stores 170 may be said to store information sets. Each of the data stores 170 may comprise an array of storage devices, such as Direct Access Storage Devices (DASDs), Just a Bunch of Disks (JBOD), Redundant Array of Independent Disks (RAID), virtualization device, etc.

The network 190 may comprise any type of network, such as, a peer-to-peer network, spoke and hub network, Storage Area Network (SAN), a Local Area Network (LAN), Wide Area Network (WAN), the Internet, an Intranet, etc.

Figure 2:
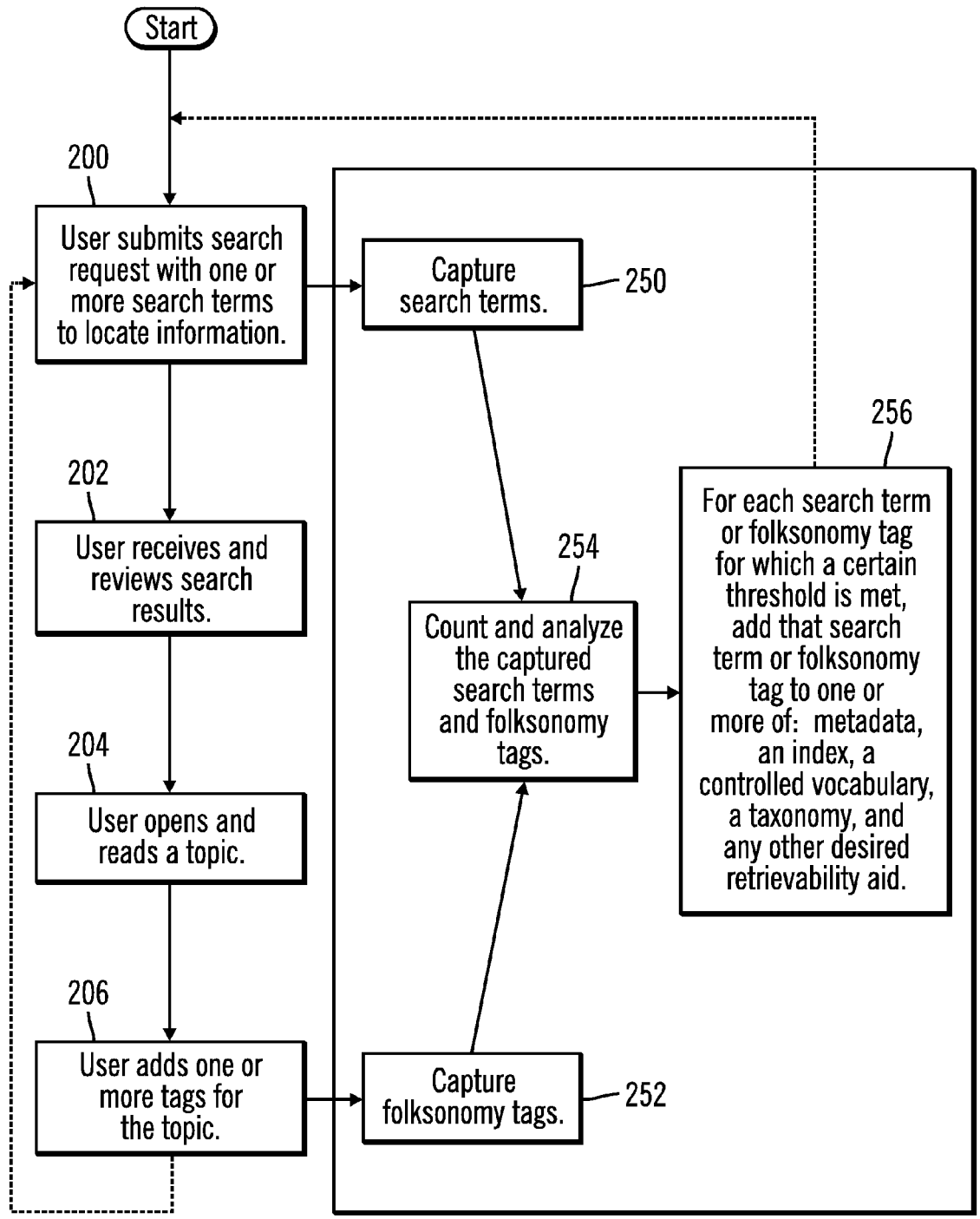
FIG. 2 illustrates a flow of processing in accordance with certain embodiments.

FIG. 2 illustrates a flow of processing in accordance with certain embodiments. Control begins at block 200 with a user submitting a search request with one or more search terms to locate information. When a search request is received at the server 120, the search terms are captured (block 250).

From block 200, processing continues to block 202. In block 202, the user receives and reviews search results returned from the search engine 130. Each search result may be considered to be a topic. In block 204, the user opens and reads a topic (i.e., one of the search results). Opening and reading the topic may also be described as selecting the topic. In block 206, the user adds one or more tags for the topic. Such tagging is referred to as folksonomy-based tagging, and the tags are referred to as folksonomy tags. In block 252, the folksonomy tags are captured.

The dashed line from block 206 to block 200 indicates that the user may loop through the processing of blocks 200-206 any number of times.

In block 254, the update engine 132 counts and analyzes the captured search terms and folksonomy tags. In block 256, for each search term or folksonomy tag for which a certain threshold is met, the update engine 132 adds that search term or folksonomy tag to one or more of: metadata, an index, a controlled vocabulary, a taxonomy, or other retrievability aid. The dashed line from block 256 to block 200 indicates that processing loops back to block 200 when a user submits another search request.

In certain embodiments, the search terms and folksonomy tags are saved by, for example, the search engine 130 (instead of the update engine 132). The search engine 130 may send the search terms and folksonomy tags to the update engine 132 or may store the search terms and folksonomy tags so that they may be accessed by the update engine 132 for processing. In certain embodiments, the functionality of the update engine 132 may be incorporated into the search engine 130.

Figure 3:
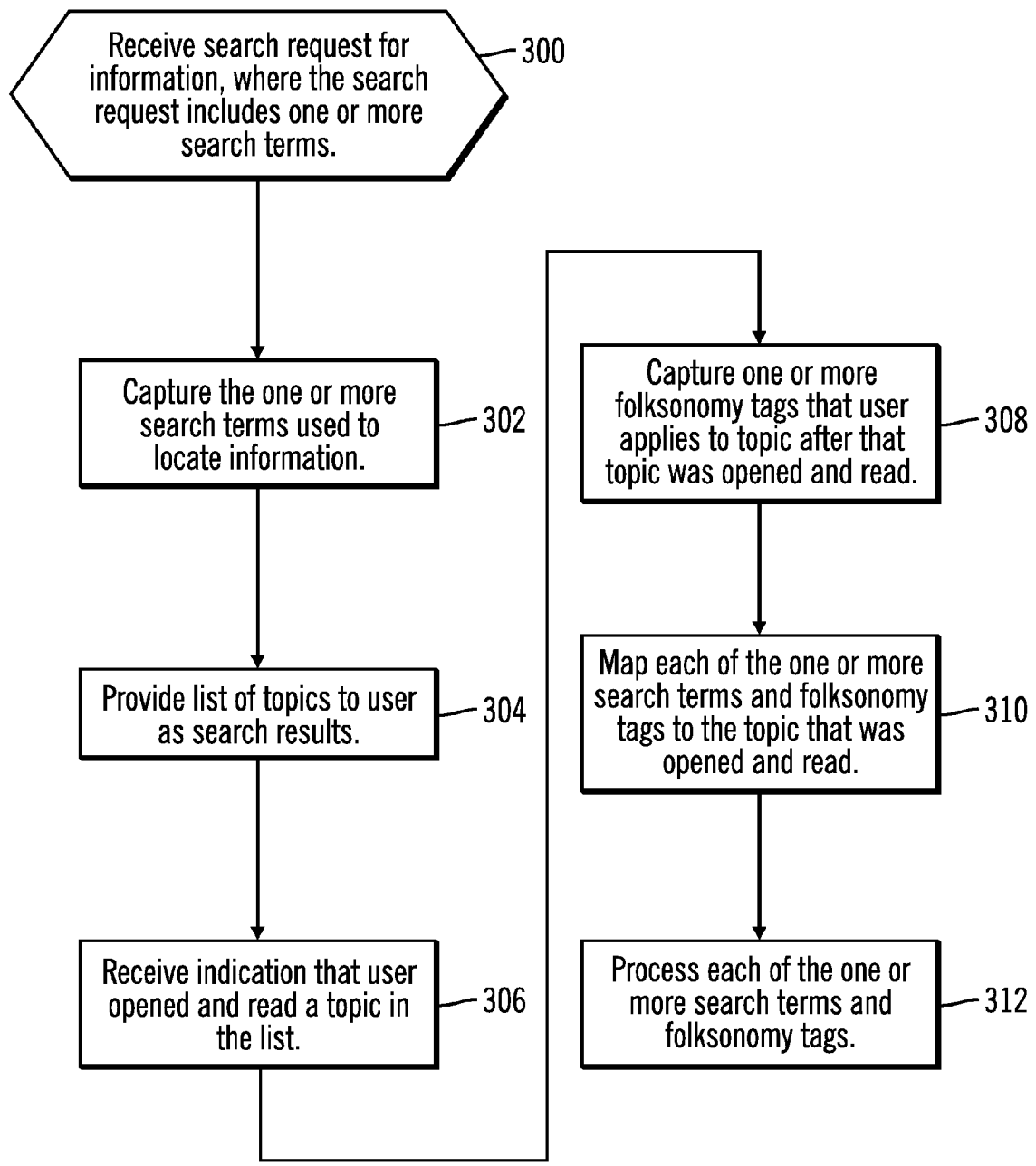
FIG. 3 illustrates logic performed by an update engine in accordance with certain embodiments.

FIG. 3 illustrates logic performed by the update engine 132 in accordance with certain embodiments. Control begins at block 300 with the search engine 130 receiving a search request for information, wherein the search request includes one or more search terms. In block 302, the one or more search terms used to locate the information are captured. In block 304, the search engine 130 provides the user with a list of topics as search results. In block 306, the update engine 132 receives an indication that the user opened and read a topic in the list of topics. The user applies one or more folksonomy tags to the topic that has been opened and read.

In block 308, one or more folksonomy tags that the user applied to the topic after that topic was opened and read are captured.

In block 310, the update engine 132 maps each of the one or more search terms and one or more folksonomy tags to a topic that was opened and read. Mapping may be described as taking each search term and folksonomy tag and associating that term or tag with the topic that was opened. If a user searches on a term, but does not select/open the topic, it is not as strong of an association to make in deciding whether or not to associate that search term with the topic by including it in the taxonomy, controlled vocabulary, etc.

Figure 4:
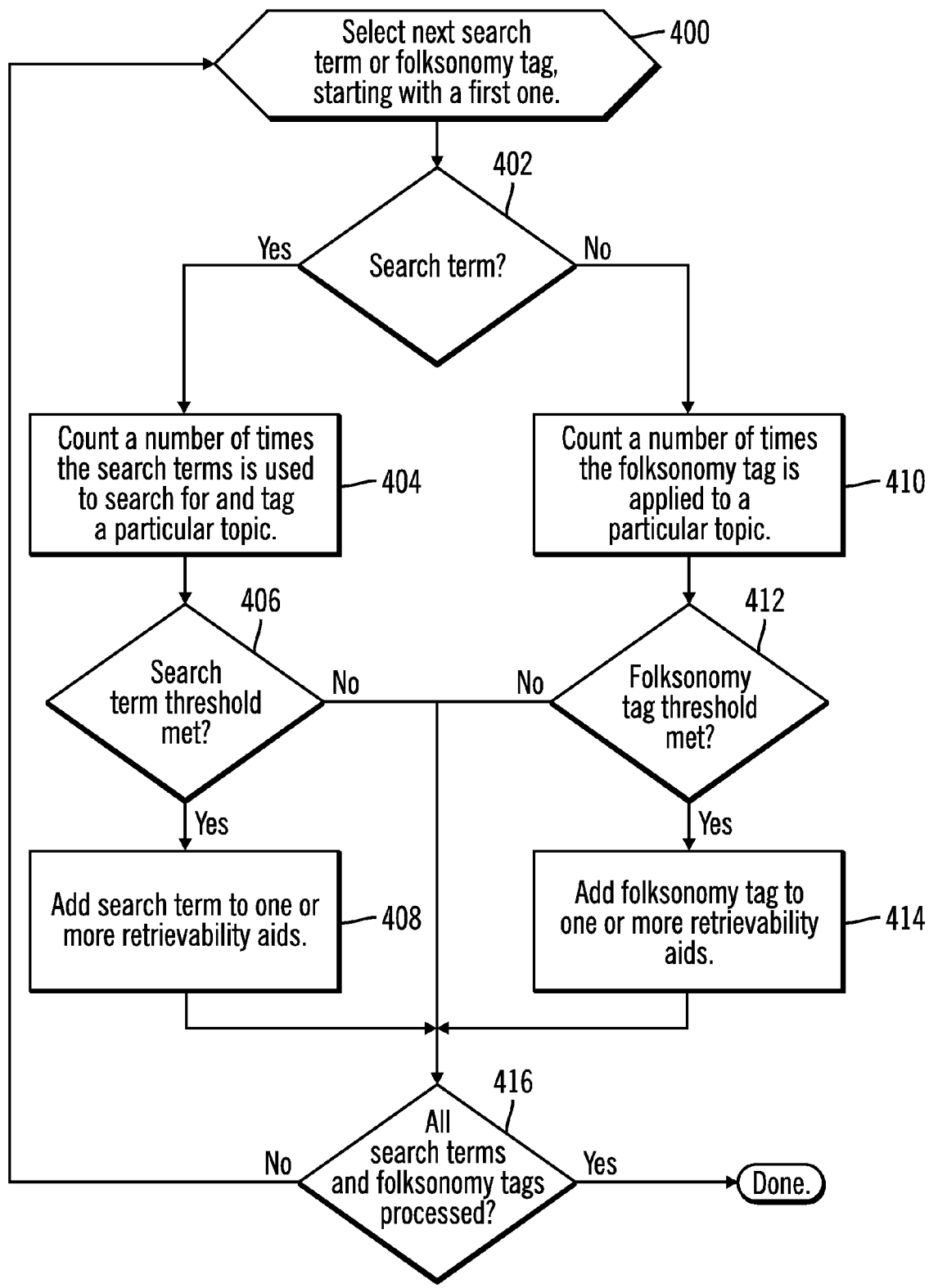
FIG. 4 illustrates logic performed by an update engine to process captured search terms and folksonomy tags in accordance with certain embodiments.

In block 312, the update engine 132 processes each of the one or more search terms and folksonomy tags (which processing is detailed in FIG. 4).

FIG. 4 illustrates logic performed by the update engine 132 to process captured search terms and folksonomy tags in accordance with certain embodiments. Control begins at block 400 with the update engine 132 selecting a next search term or folksonomy tag, starting with a first one. In block 402, the update engine determines whether a search term has been selected. If so, processing continues to block 404, otherwise, processing continues to block 410.

In block 404, the update engine counts a number of times the search term is used to search for and tag a particular topic. In block 406, the update engine determines whether the count meets a search term threshold. If so, processing continues to block 408, otherwise, processing continues to block 416. In block 408, the update engine 132 adds the search term to one or more retrievability aids (e.g., metadata, an index, a controlled vocabulary, and/or a taxonomy). In certain embodiments, the search term threshold is configurable in the update engine 132, and an administrator who defines, maintains, and/or supports the update engine 132 may configure the threshold.

In block 410, the update engine 132 counts a number of times the folksonomy tag was applied to a particular topic. In block 412, the update engine 132 determines whether the count meets a folksonomy tag threshold. If so, processing continues to block 414, otherwise, processing continues to block 416. In block 414, the update engine 132 adds the folksonomy tag to one or more retrievability aids (e.g., metadata, an index, a controlled vocabulary, and/or a taxonomy). In certain embodiments, the folksonomy tag threshold is configurable in the update engine 132, and an administrator who defines, maintains, and/or supports the update engine 132 may configure the thresholds.

In block 416, the update engine 132 determines whether all search terms and folksonomy tags have been processed. If so, processing is done, otherwise, processing loops back to block 400 to select another search term or folksonomy tag.

Thus, after some pre-configured number of times a search term or folksonomy tag is used, the update engine 132 dynamically updates the metadata, index, controlled vocabulary, and/or taxonomy with the new search term or folksonomy tag, which enhances the retrievability of the information for other search requests.

Merely to enhance the understanding of embodiments, an example is provided herein:

1. UserA searches for "Creating tables" within an information set on the Internet (i.e., "Creating" and "tables" are search terms)
2. UserA receives a list of topics as a search result and opens and reads the "Adding tables to the database" topic that is seventh in the list
3. UserA tags this topic as "Creating tables" (i.e., "Creating tables" is a folksonomy tag)
4. The update engine 132 captures the search term and the folksonomy tag
5. The update engine 132 increments counters for the search terms and the folksonomy tag and performs analysis on the term "creating tables"
6. In this example, this is the 50th time "creating tables" has been used to search for and tag the topic of "Adding tables to the database", and the update engine 132 completes the following tasks:
    Adds "creating tables" to an index of the information set
    Adds "creating" to the underlying taxonomy being used with this information set
    Adds "creating," "tables," and "creating tables" to the metadata for the topic "Adding tables to the database"
7. Subsequently, UserB searches for "Creating tables" within the information set
8. UserB receives several topics, with "Adding tables to the database" as the first entry in the list Note that in the example, UserA received the "Adding tables to the database" topic as the seventh topic in the list, while UserB received the "Adding tables to the database" topic as the first entry in the list. Thus, the search terms and the folksonomy tags of previous users impacted the position of the "Adding tables to the database" topic in the list of topics returned as search results.

Thus, embodiments provide a technique for dynamically updating metadata, an index, a controlled vocabulary, a taxonomy, and/or other retrievability aids of information sets. Embodiments may be implemented in Internet and intranet information delivery systems, especially as they connect to information.

Embodiments capture search term for user search requests and folksonomy tagging, and, after a configured number of uses of those search terms or folksonomy tags, dynamically update the metadata, index, controlled vocabulary, taxonomy, or other pre-configured terms that were meant to aid in retrieving information. That is, by directly capturing the users' search terms or folksonomy tagging, and applying certain logic, embodiments dynamically build and enhance the retrievability aids of information sets.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, and 4 may be implemented in software, hardware, programmable and non-programmable gate array logic or in some combination of hardware, software, or gate array logic.

Figure 5:
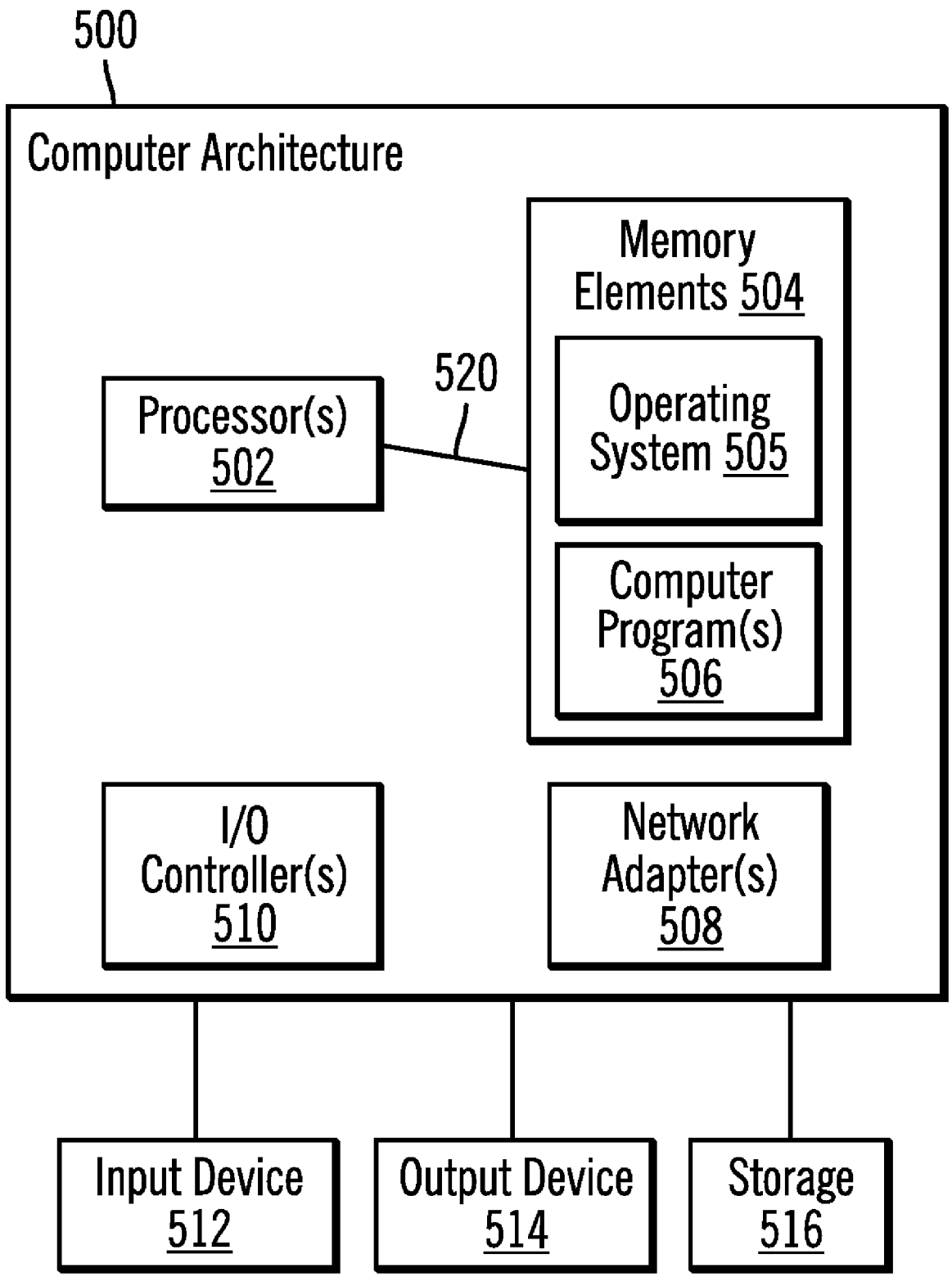
FIG. 5 illustrates a system architecture that may be used in accordance with certain embodiments.

FIG. 5 illustrates a system architecture 500 that may be used in accordance with certain embodiments. Client computer 100 and/or server computer 120 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
receiving a search request including one or more search terms;
capturing each of the one or more search terms;
providing a list of topics to a user as search results;
receiving user selection of a topic in the list of topics, wherein the user adds one or more folksonomy tags to the topic after reviewing the topic;
capturing the one or more folksonomy tags added by the user to the topic;
mapping each of the one or more search terms and each of the one or more folksonomy tags to the topic;
for each of the search terms:
 counting a first number of times the search term has been used for both searching and adding folksonomy tags to the topic; and
 based on the first number of times, adding the search term to retrievability aids by adding the search term to metadata for the topic, to an index, to a controlled vocabulary, and to a taxonomy, and wherein the adding is based on a search term threshold; and
for each of the one or more folksonomy tags:
counting a second number of times the folksonomy tag has been added to the topic; and
based on the second number of times, adding the folksonomy tag to retrievability aids by adding the folksonomy tag to the metadata for the topic, to the index, to the controlled vocabulary, and to the taxonomy, and wherein the adding is based on a folksonomy tag threshold.

2. The method of claim 1, wherein selecting the topic comprises opening and reading the topic.

3. The method of claim 1, further comprising: determining whether the first number of times meets the search term threshold; and in response to determining that the first number of times meets the search term threshold, adding the search term to the retrievability aids.

4. The method of claim 1, further comprising: determining whether the second number of times meets the folksonomy tag threshold; and in response to determining that the second number of times meets the folksonomy tag threshold, adding the folksonomy tag to the retrievability aids.

5. The method of claim 1, wherein the search request is a first search request and the list of topics is a first list of topics, and further comprising:
receiving a second search request using the one or more search terms; and
providing a second list of topics to a user as search results, wherein the topic that was selected in the first list of topics in response to the first search request is located in a different position on the second list of topics based on the one or more search terms and the one or more folksonomy tags added to the retrievability aids.

6. The method of claim 1, wherein mapping comprises associating each of the one or more search terms and the one or more folksonomy tags with the topic that was selected.

7. A computer program product comprising a computer-readable storage medium including a computer readable program, wherein the computer readable program when executed on a computer causes the computer to:
receive a search request including one or more search terms;
capture each of the one or more search terms;
provide a list of topics to a user as search results;
receive user selection of a topic in the list of topics, wherein the user adds one or more folksonomy tags to the topic after reviewing the topic;
capture the one or more folksonomy tags added by the user to the topic; and
map each of the one or more search terms and each of the one or more folksonomy tags to the topic;
for each of the search terms:

8. The computer program product of claim 7, wherein selecting the topic comprises opening and reading the topic.

9. The computer program product of claim 7, wherein the computer readable program when executed on a computer causes the computer to: determine whether the first number of times meets the search term threshold; and in response to determining that the first number of times meets the search term threshold, add the search term to the retrievability aids,
based on the first number of times, adding the search term to retrievability aids by adding the search term to metadata for the topic, to an index, to a controlled vocabulary, and to a taxonomy, and wherein the adding is based on a search term threshold; and
for each of the one or more folksonomy tags:
counting a second number of times the folksonomy tag has been added to the topic; and
based on the second number of times, adding the folksonomy tag to retrievability aids by adding the folksonomy tag to the metadata for the topic, to the index, to the controlled vocabulary, and to the taxonomy, and wherein the adding is based on a folksonomy tag threshold.

10. The computer program product of claim 7, wherein the computer readable program when executed on a computer causes the computer to: determine whether the second number of times meets the folksonomy tag threshold; and in response to determining that the second number of times meets the folksonomy tag threshold, add the folksonomy tag to the retrievability aids.

11. The computer program product of claim 7, wherein the search request is a first search request and the list of topics is a first list of topics, and wherein the computer readable program when executed on a computer causes the computer to:
receive a second search request using the one or more search terms; and
provide a second list of topics to a user as search results, wherein the topic that was selected in the first list of topics in response to the first search request is located in a different position on the second list of topics based on the one or more search terms and the one or more folksonomy tags added to the retrievability aids.

12. The computer program product of claim 7, wherein mapping comprises associating each of the one or more search terms and the one or more folksonomy tags with the topic that was selected.

13. A system, comprising:

hardware logic performing operations, the operations comprising:

receiving a search request including one or more search terms;

capturing each of the one or more search terms; providing a list of topics to a user as search results;

receiving user selection of a topic in the list of topics, wherein the user adds one or more folksonomy tags to the topic after reviewing the topic;

capturing the one or more folksonomy tags added by the user to the topic; and mapping each of the one or more search terms and each of the one or more folksonomy tags to the topic;

for each of the search terms:

counting a first number of times the search term has been used for both searching and adding folksonomy tags to the topic; and based on the first number of times, adding the search term to retrievability aids by adding the search term to metadata for the topic, to an index, to a controlled vocabulary, and to a taxonomy, and wherein the adding is based on a search term threshold; and for each of the one or more folksonomy tags:

counting a second number of times the folksonomy tag has been added to the topic; and based on the second number of times, adding the folksonomy tag to retrievability aids by adding the folksonomy tag to the metadata for the topic, to the index, to the controlled vocabulary, and to the taxonomy, and wherein the adding is based on a folksonomy tag threshold.

14. The system of claim 13, wherein selecting the topic comprises opening and reading the topic.

15. The system of claim 13, wherein the operations further comprise: determining whether the first number of times meets the search term threshold; and in response to determining that the first number of times meets the search term threshold, adding the search term to the retrievability aids.

16. The system of claim 13, wherein the operations further comprise: determining whether the second number of times meets the folksonomy tag threshold; and in response to determining that the second number of times meets the folksonomy tag threshold, adding the folksonomy tag to the retrievability aids.

17. The system of claim 13, wherein the search request is a first search request and the list of topics is a first list of topics, and wherein the operations further comprise:

receiving a second search request using the one or more search terms; and providing a second list of topics to a user as search results, wherein the topic that was selected in the first list of topics in response to the first search request is located in a different position on the second list of topics based on the one or more search terms and the one or more folksonomy tags added to the retrievability aids.

18. The system of claim 13, wherein mapping comprises associating each of the one or more search terms and the one or more folksonomy tags with the topic that was selected.

* * * * *